United States Patent [19]

Patterson et al.

[11] 4,272,259
[45] Jun. 9, 1981

[54] GAS GETTERING SYSTEM

[75] Inventors: Michael F. Patterson, Clarence; Harry Cheung, Buffalo; David I. J. Wang, New York, all of N.Y.

[73] Assignee: Union Carbide Corporation, New York, N.Y.

[21] Appl. No.: 806,340

[22] Filed: Jun. 14, 1977

Related U.S. Application Data

[63] Continuation of Ser. No. 707,335, Jul. 21, 1976, abandoned.

[51] Int. Cl.³ .................................................. B01D 53/04
[52] U.S. Cl. ............................................. 55/74; 316/25; 417/48
[58] Field of Search ................ 55/16, 68, 74, 208, 55/387; 206/84; 220/8, 9 B, 9 C, 9 LG; 316/25; 417/48, 49, 51

[56] References Cited

U.S. PATENT DOCUMENTS

| | | | |
|---|---|---|---|
| 1,678,154 | 7/1928 | Mensing et al. | 206/84 X |
| 2,060,861 | 11/1936 | Glans | 417/48 |
| 2,082,268 | 6/1937 | Varian | 417/48 |
| 2,915,172 | 12/1959 | Rishell | 417/48 |
| 3,108,706 | 10/1963 | Matsch et al. | 417/48 X |
| 3,114,469 | 12/1963 | Francis et al. | 220/9 C |
| 3,187,885 | 6/1965 | Hansen et al. | 417/48 |
| 3,260,356 | 7/1966 | Garbe | 417/48 |

FOREIGN PATENT DOCUMENTS

1187649 2/1965 Fed. Rep. of Germany .......... 220/9 C

*Primary Examiner*—Robert H. Spitzer
*Attorney, Agent, or Firm*—Harrie M. Humphreys

[57] ABSTRACT

A fluid-tight container holding active getter and non-sorbable gas at a pressure of at least about one atmosphere, with gas flow passage means through a wall of the container providing communication between the active getter and the container-surrounding environment, and removable closure means for the gas flow passage means. The container may be opened for gas flow communication and exposure of the active getter prior to sealing of a vacuum enclosure in which it is installed, without significant loss or impairment of sorptive capacity of the getter.

5 Claims, 12 Drawing Figures

GAS GETTERING SYSTEM

REFERENCE TO RELATED APPLICATIONS

This is a continuation of application Ser. No. 707,335 filed July 21, 1976, now abandoned.

BACKGROUND OF THE INVENTION

1. Field of the Invention

This invention relates to a method of and apparatus for removing gas from a vacuum enclosure by gettering and for introducing active getter into a vacuum enclosure such as may be employed for thermal insulation.

2. Description of the Prior Art

In the prior art methods of forming and maintaining vacuum in vacuum enclosures, it has been common practice to employ getter materials for sorption of gaseous components in the vacuum enclosure to achieve low gas pressures therein. The getter thus is disposed in the evacuable enclosure and has the primary function of taking up inleaking and evolving gases over the vacuum service life of the enclosure thereby continuously maintaining vacuum pressures at or below a predetermined low level. However, the getter may also be employed to reduce the initial evacuation pumping time necessary for attainment of the low vacuum operating low pressure in the system and to remove the gases and vapors initially present on the internal surfaces of the vacuum enclosure.

In systems where vacuum is employed to provide high quality thermal insulation, the use of getter materials is particularly advantageous. In these systems, the absolute pressure must be maintained below some specified upper limit; unless a high degree of evacuation is maintained, heat transmission in the insulation space by gaseous conduction may be excessive. Getter materials provide an effective means of achieving such levels of vacuum maintenance over prolonged periods of time, and accordingly, have been widely used in the thermal insulation art.

Despite their effectiveness, however, certain getter materials pose particular difficulty in handling due to their high activity, i.e., their tendency to strongly and spontaneously sorb gas under ambient conditions. With such active materials, any appreciable ambient exposure may result in rapid and significant decrease in the gas sorption capacity of the getter. The problem is especially severe where the getter is relatively expensive and supplied in small quantity, as is the case in many vacuum system applications. Moreover, many active getters exhibit relatively high heats of sorption, which may further aggravate the handling and installation problem.

Heretofore, the prior art has in some instances overcome the material handling problem associated with active getter materials by providing the getter in a relatively inert form. In this form the getter is disposed in the vacuum enclosure and thermally activated in situ after the vacuum enclosure has been evacuated and sealed. However, such methods generally require considerable direct or indirect heating involving extreme high temperature, which is impractical in many cases due to the likelihood of damage to the vacuum enclosure system.

The prior art has also provided active getter in fluid-tight packages which are installed in the vacuum enclosure and, after evacuation and sealing of the enclosure, are opened by indirect means. For example, in U.S. Pat. No. 3,108,706 to L. C. Matsch et. al and in U.S. Pat. No. 3,114,468 to A. W. Francis et. al, active getter is provided in a gas-tight vial under vacuum or inert atmosphere. The vial containing active getter is then installed in a thin-walled extension of the vacuum enclosure to be gettered. After evacuation and sealing of the vacuum enclosure, the walls of the extension are mechanically deformed until the vial is crushed, thereby exposing the getter and commencing gas sorption in the enclosure.

The above method, while generally providing efficient vacuum maintenance, has several associated disadvantages which limit its effectiveness. For example, in vacuum enclosures having metallic walls, breakage of the active getter-containing vial occasionally does not occur under deformation of the extension walls and visual vertification of the active-getter exposure is not possible. Extreme levels of deformation of the thin-walled extension may serve to increase the likelihood of active getter exposure, but may also rupture the thin-walled section and impair the leak-tightness of the vacuum enclosure. In addition, when vacuum enclosures processed according to the above method lose vacuum after extended period in service due to saturation of the getter, reconditioning or renewal of the vacuum system is necessary. In the renewal operation, the thin walled extension of the vacuum enclosure must be removed along with the crushed vial and saturated getter. The thin-walled extension must then be refabricated, secured to the vacuum enclosure, and tested for leak-tightness. Such procedure is time-consuming, tedious and expensive.

It is accordingly an object of the present invention to provide an improved method of and apparatus for removing gas from a vacuum enclosure by gettering.

Another object of the invention is to provide an improved method of and apparatus for exposing an active getter to a vacuum enclosure without in situ activation of the getter material.

A further object of the invention is to provide an improved container for active getter which may be opened for gas flow communication and exposure of the getter prior to sealing of the vacuum enclosure in which it is installed, without significant loss or impairment of sorptive capacity of the getter.

A still further object of the invention is to provide an improved method of and apparatus for using getter to re-establish and maintain vacuum in a vacuum enclosure which does not require refabrication of vacuum enclosure walls.

Other objects and advantages of the present invention will become apparent from the ensuing disclosure and appended claims.

SUMMARY OF THE INVENTION

This invention relates to a method of and apparatus for removing gas from a vacuum enclosure by gettering and for introducing active getter into a vacuum enclosure such as may be employed for thermal insulation.

The apparatus aspect of the present invention relates to an apparatus for sorption of gas by gettering which comprises a fluid-tight container holding active getter and non-sorbable gas at a pressure of at least about one atmosphere. The container has gas flow passage means through a wall thereof providing communication between the active getter and the container-surrounding environment, wherein the ratio of the vacuum flow conductance of the gas flow passage means, in liters/sec., to the mass of said active getter held in said container, in grams, is in the range of from about $6.0 \times 10^{-8}$ to about $1.0 \times 10^{-2}$. Removable closure means are provided for the gas flow passage means.

The method aspect of the invention relates to a method for evacuating a vacuum enclosure. Under this method a fluid-tight container holding active getter and non-sorbable gas at a pressure of at least about one atmosphere is provided. Gas flow communication is established through a wall of the container, between the active getter and the container-surrounding environment by passage means in the container wall, such that the ratio of the vacuum flow conductance of the gas flow passage means, in liters/sec., to the mass of the active getter held in the container, in grams, is in the range of from about $6.0 \times 10^{-8}$ to about $1.0 \times 10^{-2}$. The container is positioned in the vacuum enclosure for gas flow communication between the active getter and the enclosure environment. Gas is removed from the enclosure and from the positioned container through the passage means for evacuation of the enclosure and container, in an amount sufficient to reduce the pressure in the enclosure and container to subatmospheric pressure. The evacuated enclosure is then sealed.

As used herein, the term "active getter" refers specifically to chemisorbent materials, i.e. materials which sorptively take up gases and vapors by the occurrence of essentially irreversible chemical reaction with the material itself as opposed to those physical adsorbent materials which sorb gases and vapors by the formation of loose, associative physical (Van der Waal) bonds. Active getters with which the present invention may advantageously be practiced include barium, strontium, lithium, and cesium. These materials, particularly barium, react very strongly and rapidly with most of the active constituents of atmospheric air, such as nitrogen, oxygen, hydrogen, carbon monoxide, carbon dioxide, and water vapor, and accordingly are especially useful for forming and maintaining vacuum in conventional vacuum enclosures such as thermos bottles, vacuum insulation panels, and the like, wherein atmospheric air must be removed to obtain vacuum integrity.

As used herein, the vacuum flow conductance of the gas flow passage means refers to the flow conductance of the gas flow passage means under vacuum conditions, i.e. the pressure level conditions, which are to be maintained in the vacuum enclosure during steady-state operation. The value of the vacuum flow conductance will depend on the configuration of the gas flow passage means used in the practice of the invention. Where the flow passage is of a geometrically simple form, such as an orifice or a tubular passage, the vacuum conductance can readily be calculated by standard flow conductance equations. Where the flow passage is of a more complex form, such as a multiplicity of tortuous openings in a wall of the container, the vacuum flow conductance may be suitably determined by experiment, as described hereinafter.

Under the above-described method of this invention, the establishment of gas flow communication through a wall of the container is carried out so as to provide a limited gas flow communication between the interior and exterior of the container, such that the flow of sorbable gas into the container is initially substantially diffusional, i.e. non-hydrodynamic, in nature. Positioning of the getter container in the vacuum enclosure may be performed either before or after the gas flow communication through the container wall is established, as is necessary or desirable in the given application. Following the gas flow communication establishment/positioning steps, gas may be suitably removed from the vacuum enclosure and the getter container in flow communication therewith by mechanical pumping or other suitable gas evacuation means. When the gas pressure in the vacuum enclosure has been reduced to the desired predetermined or approximate level, the vacuum enclosure is sealed. After the sealing step, the active getter will combine with and remove sorbable gases from the vacuum enclosure, thereby maintaining vacuum pressures at the desired low level during the service life of the vacuum enclosure.

In accordance with the method of the present invention, gas flow communication is established through a wall of the getter container under ambient conditions prior to evacuation and sealing of the vacuum enclosure, yet the contained getter is prevented from prematurely combining with ambient gases by means of a non-sorbable gas in the container at a pressure of at least about one atmosphere, together with properly dimensionally sized gas flow passages. In the preferred practice of the invention, non-sorbable gas as for example helium, neon, argon, krypton or xenon, is held in the container at substantially atmospheric pressure, i.e., the pressure of the container-surrounding environment, so that when gas flow communication is established, no pressure differential exists across the wall of the container having the gas flow passage means therein. Under such conditions a state of countercurrent flow gaseous diffusion is created. Diffusion is inherently a relatively slow flow phenomenon, so that the ingress of sorbable gas into the getter container proceeds at an exceedingly low rate. As the diffusional flow process is continued, molecules of sorbable gas eventually reach the getter surface and are quickly sorbed thereon. In their sorbed state, these gaseous molecules exert only a very low vapor pressure. As a result, a pressure gradient is created which grows with time as increasing amounts of gas are sorbed, giving rise to a decreasing diffusional component and an increasing hydrodynamic component of the flow into the container. Notwithstanding the increasing rate of flow into the container with time, it has been found that in accordance with the present invention, the hydrodynamic flow of sorbable gas into the container can be restricted to a low value so that getter consumption during ambient handling and installation of the container is minimized. In this regard, the dimensional sizing of the getter container's gas flow passages is highly important.

With respect to ambient exposure of the container it is desirable to maintain the size of the gas flow passage means relatively small in size so as to restrict the inflow of sorbable gas. Under service conditions on the other hand, it is desirable to size the gas flow passage means as large as possible for the given vacuum level, in order that the gases in the vacuum enclosure have ready access to the getter. In accordance with the present invention, both of these requirements are satisfied by providing the getter container with flow passage means wherein the ratio of the vacuum flow conductance of the flow passage means, in liters/sec., to the mass of the active getter in the container, in grams, is in the range of from about $6.0 \times 10^{-8}$ to about $1.0 \times 10^{-2}$. A ratio values below about $6.0 \times 10^{-8}$, either the flow of sorbable gas into the container under vacuum operating conditions is excessively low, by virtue of an associated high pressure drop across the gas flow passage means, so that suitable low vacuum pressures on the order of 1000 microns Hg and lower cannot be maintained, or else an excessive and wasteful amount of active getter has been provided in the container relative to the amount of sorbable gas entering the containers through the gas flow passage means. At ratio values above about $1.0 \times 10^{-2}$, either an insufficient mass of getter is provided relative to the amount of sorbable gas entering the container through the gas flow passage means under vacuum service conditions, or else the flow conductance of the gas flow passage means is so high that the allowable ambient exposure times for the getter container during or after installation in the vacuum enclosure are impractically short to retain sufficient mass of active getter for vacuum operation.

Under the foregoing, various sub-ranges of the ratio of the vacuum flow conductance of the gas flow passage means, in liters/sec, to the mass of the active getter held in the container, in grams, have been found to be particularly useful in maintaining specific vacuum pressure levels. For example, to provide a vacuum pressure level of between 100 and 1000 microns Hg in the vacuum enclosure, the above ratio is preferably in the range of from about $6.0 \times 10^{-8}$ to about $1.0 \times 10^{-5}$. At intermediate vacuum pressure levels of between 1 and 100 microns Hg, the ratio is preferably in the range of from about $5.5 \times 10^{-7}$ to about $3.5 \times 10^{-4}$. For low vacuum pressure applications with pressure levels of 0.1 to 1.0 microns Hg, preferred ratio values are in the range of from about $3.7 \times 10^{-6}$ to about $1.0 \times 10^{-2}$.

In the application of vacuum renewal, the method and apparatus of this invention have been successfully used to renew and maintain low pressure vacuum in vacuum enclosures which had lost vacuum after extended periods in service, in a manner significantly simpler and less costly than achievable with the means and methods of prior art.

DESCRIPTION OF THE PREFERRED EMBODIMENTS

Figure 1:
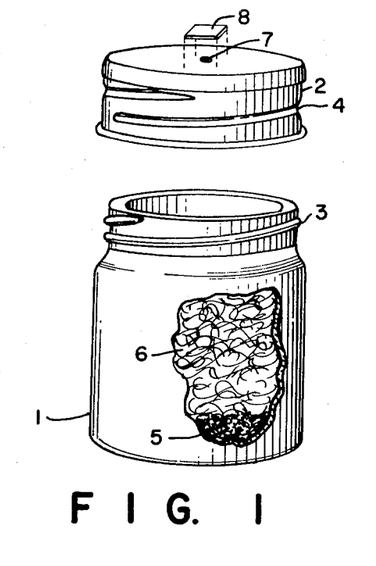
FIG. 1 is an exploded, partial breakaway view of an illustrative getter container according to one embodiment of the present invention.

Referring now to the drawings, FIG. 1 shows an exploded, partial breakaway view of an illustrative getter container according to the present invention. A receptacle 1 is provided which holds active getter 5 and an inert bulk packing material 6 such as glass, wool or cotton for fixably retaining the active getter in spaced relationship to the gas flow passage means, as described hereinafter. A cap 2 is provided having threading 4 complimentary to threading 3 on the receptacle, so that when the cap and receptacle are fully engaged the threadings 3 and 4 form a fluid-tight seal. To insure positive sealing, it may be desirable in some cases to coat the respective threadings with a sealant such an an epoxy prior to joining the cap and the receptacle. In addition it may be desirable to provide a resilient ring gasket (not shown) in the cap for mating engagement with the top edge of the receptacle to insure fluid-tight sealing of the container. The cap and receptacle forming the container are formed of substantially fluid impermeable materials as for example aluminum or glass. A gas flow passage 7 through the cap wall of the container provides communication between the active getter 5 and the container-surrounding environment. Removable closure means are provided for the gas flow passage 7 in the form of a closure patch 8 which may comprise a suitably sized section of commercially available adhesive tape or a metal foil laminate tape which is applied over the gas flow passage 7 to the top surface of cap 2 to seal the gas flow passage and thereby prevent premature combination of the active getter with sorbable gas components.

The gas flow passage of the FIG. 1 container may suitably comprise a circular orifice of constant cross-section drilled through cap 2. When the closure patch 8 is removed from the gas flow passage 7, gas will flow into the container through the circular passage such that the direction of gas flow parallels the centerline of the opening. In accordance with the present invention, the gas flow passage means are dimensionally sized such that the ratio of the vacuum flow conductance of the gas flow passage means, in liters/sec, to the mass of the active getter held in the container, in grams, is in the range of from about $6.0 \times 10^{-8}$ to about $1.0 \times 10^{-2}$.

In the preferred practice of the invention the mass of the active getter held in the container is desirably in the range of from about 0.1 to about 100 grams. Under such preferred practice, the ratio of the average flow passage diameter, in centimeters, to the mass of the active getter used in the container, in grams, is desirably in the range of from about 0.001 to about 0.01 and the average flow passage length is between 0.01 and 10 centimeters. For example, the FIG. 1 container may hold 10 grams of active barium getter and have a gas flow passage diameter of 0.025 centimeter and a gas flow passage length of 0.023 centimeter.

The vacuum flow conductance for an aperture type gas flow passage as employed in the FIG. 1 embodiment is readily calculated by the following equation:

$$Sv = 11.6 A$$

when $S_V$ = vacuum conductance in liters/sec., and

A = area of the gas flow passage aperture in square centimeters.

Thus for the above-described container of FIG. 1, wherein the gas flow passage diameter is 0.025 centimeter, the vacuum flow conductance of the gas flow passage, as calculated by the above equation, is $5.69 \times 10^{-3}$ liters/sec. and the ratio of the vacuum flow conductance of the gas flow passage, in liters/sec., to the mass of active getters held in the container, is $5.69 \times 10^{-4}$.

The potential level of utilization of a given mass of active getter depends to a large extent on its physical form. A requisite condition for high utilization is a large getter surface area, i.e., the thickness of the getter particles is very small. This condition is necessary to permit essentially complete utilization of all of the active getter exposed to the vacuum enclosure and maintain a suitably high rate of gettering action throughout the life of the vacuum enclosure. If the active getter is provided in relatively large, fused particles, only the outer portion of the particles will react at a sufficiently high rate to be useful for maintaining low vacuum pressures. Under the above considerations, the active getter in FIG. 1 container may be supplied in a finely divided state such as in the form of powder or granules as shown, or in the form of a tablet comprised of loosely agglomerated granules of active getter, or alternatively the active getter may be provided in the form of a thin film deposited on a supportive substrate, e.g., the inner walls of the receptacle. In the preferred practice of the present invention, the active getter should have a surface area of at least 1 m$^2$/gm, as determined by standard BET Isotherm measurements. Surface area values of at least 1 m$^2$/gm are desired in order to obtain suitably high levels of utilization of the active getter's gas sorption capacity.

The quantity of getter required to maintain low vacuum pressure levels in a given vacuum enclosure is dependent on many factors including the length of the ambient exposure of the container, the form and type of the getter, the quality of the vacuum enclosure fabrication and the vacuum system materials of construction. There is no actual upper limit to the quantity of getter which may be supplied to the vacuum space; however, it is desirable to minimize the amount in the interest of efficiency, safety, and economy. As discussed earlier herein, it is preferred in the practice of the present invention to provide between 0.01 and 100 grams of active getter in the container, as a balance of the above factors.

Under the invention a non-sorbable gas at a pressure of at least about one atmosphere is held in the container along with the active getter. Such condition prevents hydrodynamic inflow of sorbable gas when the container is exposed in an ambient environment, i.e. when gas flow communication is established between the interior and exterior of the container. In the preferred practice of the present invention, the non-sorbable gas held in the container is at substantially atmospheric pressure in order to minimize gas flow disturbances during the gas flow communication establishment step. Gas flow communication in the FIG. 1 container is established simply by manual removal of the closure patch 8 overlying the single gas flow passage 7.

Figure 2:
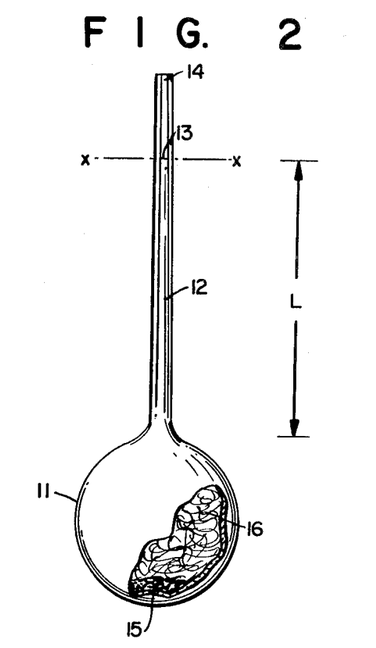
FIG. 2 is a partial breakaway view of another illustrative container embodiment.
Figure 3:
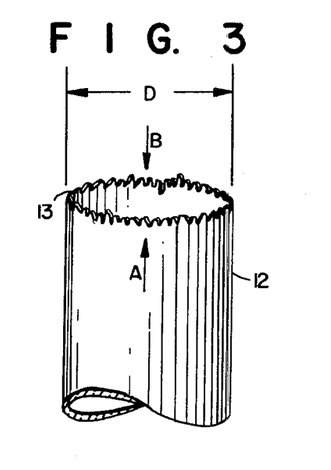
FIG. 3 is a view of the exposed gas flow passage of the FIG. 2 container.

FIG. 2 shows a getter container embodiment in which the gas flow passage means comprise a tubular passage 12. The container receptacle 11 holds finely divided active getter 15 and inert bulk packing material 16 as well as non-sorbable gas, for example argon, at substantially one atmosphere pressure. The gas flow passage 12 is a tube of constant diameter which is sealed at its upper end 14 and is scored at 13 along line x—x. Both receptacle 11 and gas flow passage 12 are constructed of fluid impervious materials as for example glass. The container is exposed by either manually or mechanically breaking off the upper end portion of the tubular passage along the line x—x to form an open inlet for the gas flow passage as shown in FIG. 3. The arrows A and B in FIG. 3 represent the directions of flow of the internally held argon non-sorbable gas and the external sorbable-component containing gas, respectively. At the instant the container is exposed, i.e., gas flow communication is established through the container wall, there is no pressure gradient across the inlet end 13 of the gas flow passage so that no hydrodynamic, i.e., pressure drop-induced, flow occurs. There are, however, concentration gradients across the inlet which cause argon to diffusionally flow out of the container and the external sorbable component-containing gas to diffusionally flow into the container. The flow of gas by diffusion is an inherently slow process relative to hydrodynamic flow, so that the rate of inflow of gas tends to be low initially. With the passage of time, however, sorbable components diffuse through gas flow passage 12 into receptacle 11 and are sorbed on the active getter. Such sorption causes a pressure gradient to be formed which grows increasingly large with the passage of time, so that after the initial sorption, exterior gas from the container-surrounding environment is at least partially hydrodynamically flowed to the active getter for sorption of the exterior gas sorbable components thereon.

As indicated earlier the design of the gas flow passage means is highly important from considerations of both ambient exposure and vacuum service. During both ambient exposure and vacuum service, the flow of gas into the container is a strong function of the dimensional and geometric characteristics of the gas flow passge means. Under the present invention, both considerations may be accommodated within a limited range of dimensional parameters. Outside of this range, the gas flow passage means either become so large in size that ambient consumption of active getter by sorbable gases becomes excessive or else become so small that its associated pressure drop is outside the range of external pressures which are consonant with effective vacuum maintainance. In a preferred embodiment of the invention, the tubular gas flow passage as shown in FIGS. 2-3 has a diameter D of between $10^{-4}$ and 0.50 cm., and a length L of between 0.01 and 10 cm. The vacuum conductance of the tubular gas flow passage is suitably calculated by the equation $$S_v = 12.12(D^3/L)$$

where $S_v$ = vacuum conductance in liters/sec.,

D = tubular passage diameter in cm., and

L = tubular passage length in cm.

Thus, for example, for a container as shown in FIGS. 2-3, having a diameter D of 0.005 cm. and a length L of 3.0 cm., the vacuum flow conductance $S_v$ of the tubular passage is $5.05 \times 10^{-7}$ liters/sec.

Figures 4A, 4B:
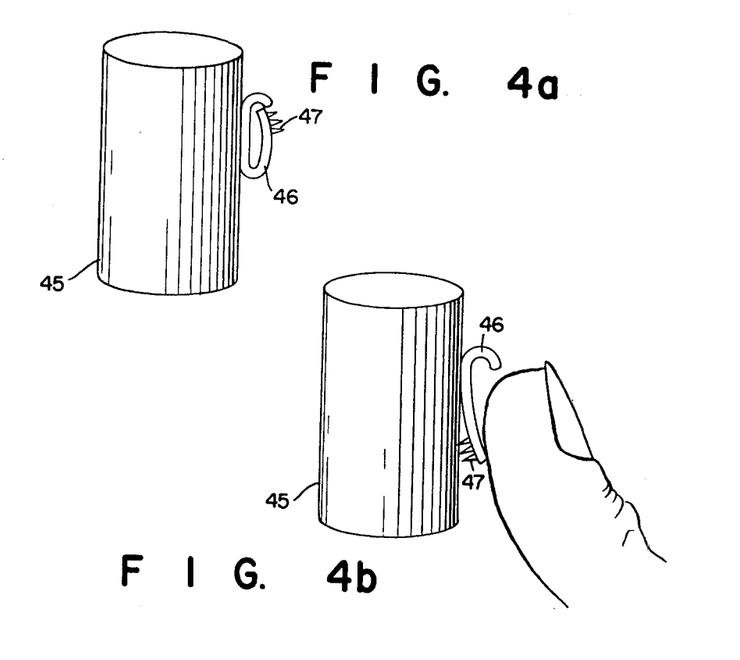
FIG. 4 illustrates the steps which are employed to establish gas flow communication between the interior and exterior of yet another illustrative container embodiment.

FIG. 4 shows another container embodiment of the invention illustrating the steps which are performed to establish gas flow communication through a wall of the container between the active getter and container-surrounding environment by passage means in the container wall. As shown in FIG. 4a a container 45 is provided which is cylindrical in shape, with flat top and bottom walls. The container holds active getter and non-sorbable gas at a pressure of at least about one atmosphere, as in the earlier described embodiments.

Figure 4C:
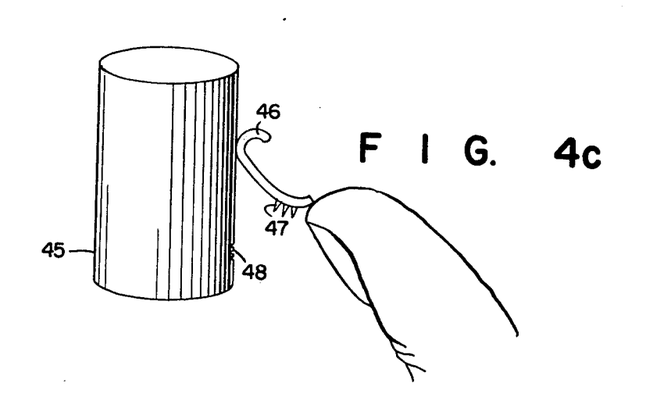

On the exterior surface of the cylindrical container wall is attached a flap 46 formed of a pliable plastic, rubber or ductile metal material. Sharp spike projections 47 are disposed on a face of the flap fixably mounted to point away from the container wall. To establish gas flow communication between the active getter and the container-surrounding environment the upper retaining end of the flap is lifted and the spike-bearing face is manually lowered and pressed against the container, as shown in (b), to puncture gas flow passages in the container wall. At this point, the spike-bearing flap functions as the aforementioned removable closure means for the gas flow passage means. In step (c), the spike-bearing face is manually removed from the container wall to expose the newly formed gas flow passages 48, to establish gas flow communication between the active getter and the container-surrounding environment.

FIG. 4 differs from the container embodiments described hereinearlier in the respect that multiple gas flow passages are provided. Regardless of the number of gas flow passages, the gas flow passage means are dimensionally sized under the broad practice of the present invention such that the vacuum flow conductance of the gas flow passage means, in liters/sec., to the mass of the active getter held in the container, in grams, is in the range of from about $6.0 \times 10^{-8}$ to about $3.5 \times 10^{-3}$.

Figure 5:
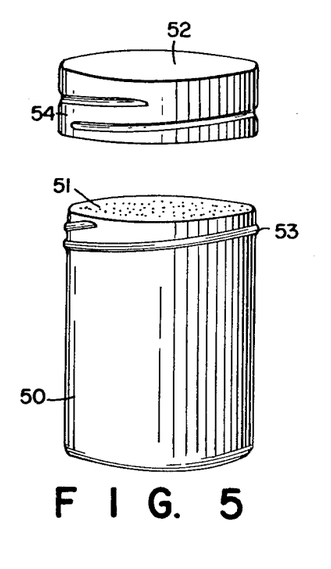
FIG. 5 shows still another embodiment of the invention in which a porous surface is employed to provide a plurality of gas flow passages.

FIG. 5 shows still another container embodiment of the invention in which a porous disk is employed to provide a plurality of gas flow passages. Referring to the FIG. 1, a receptacle 50 holding active getter and non-sorbable gas at a pressure of at least about one atmosphere is joined with an overlying sealing cap 52 by means of the respective complimentary threadings 53 and 54. The receptacle features an integrally bonded porous disk 51 which forms the top surface of the receptacle and provides the gas flow passage means for the container.

Figure 6:
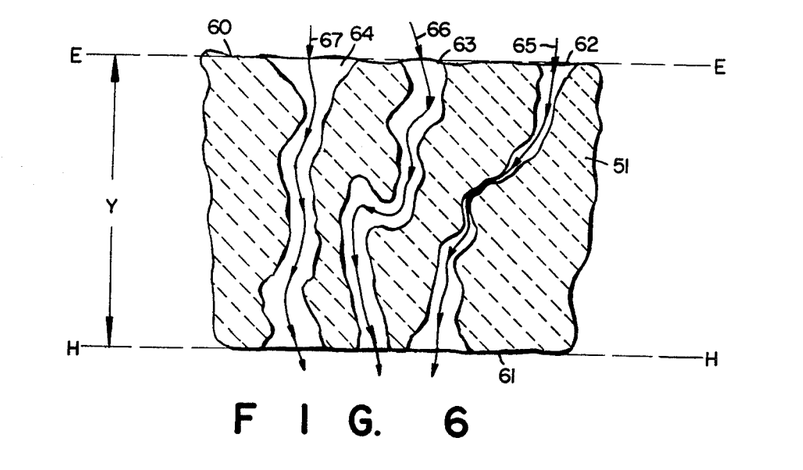
FIG. 6 is a sectional elevational view of the porous surface of the FIG. 5 container, showing dimensional characteristics of the illustrative gas flow passages therein.

FIG. 6 is a sectional elevational view of the porous disk 51 of the FIG. 5 container showing illustrative gas flow passages 62, 63 and 64 therein which are continuous between the top disk surface 60 and the bottom disk surface 61. The direction of gas flow through the gas flow passages is shown by the respective arrows 65, 66 and 67. In the FIG. 6 system, the longitudinal dimensions of the gas flow passages are the lengths of the lines 65, 66, 67 measured from the inlet end E—E to the outlet end H—H. As an example, if the linear distance Y between the inlet and outlet ends is assigned a value of unity, the longitudinal dimensions of passages 65, 66 and 67 are approximately 1.06, 1.22 and 1.16, respectively.

Figure 7:
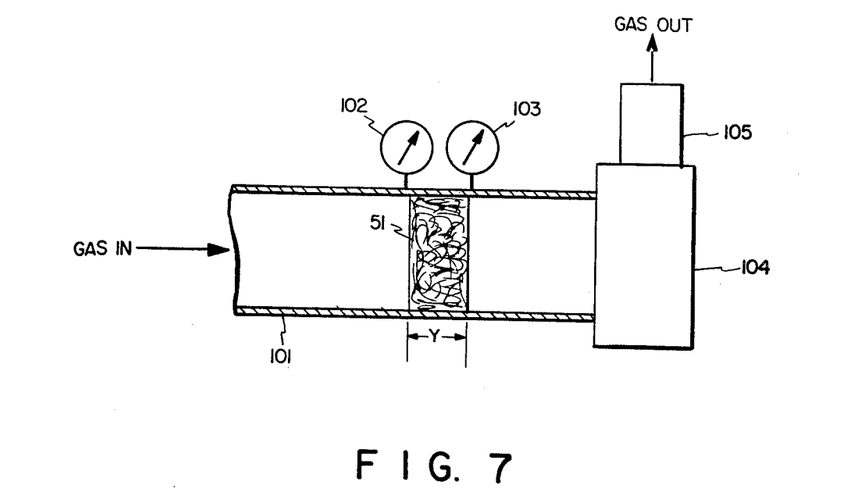
FIG. 7 is a schematic diagram of apparatus for determining the vacuum flow conductance of gas flow passage means such as shown in FIG. 6.

FIG. 7 is a schematic diagram of apparatus for determining the vacuum flow conductance of gas flow passage means such as shown in FIG. 6, for which a vacuum flow conductance cannot readily be calculated. In the illustrated apparatus, a section of the material 51 containing the gas flow passage means is inserted in the tubular conduit 101 between the two pressure indicators 102 and 103. The test material section 51 has a length Y, as measured in the axial direction along the tubular conduit 101, and a cross-sectional area A, measured in a plane perpendicular to the axis of conduit 101. Gas is pumped (by means not shown) through the tubular conduit 101 and the test material section 51 therein and through a flow meter 104, with the gas being discharged from the flow meter by conduit 105. The pressure downstream of the test material section, measured by pressure indicator 103, is held at one atmosphere. The gas flow rate Q, is varied until the pressure upstream of the test material section, as measured by pressure indicator 102, is near one atmosphere, e.g., 1.1 atm. The gas flow rate Q, pressure $P_1$ upstream of the test material section, as measured by pressure indicator 102, and the pressure $P_2$ downstream of the test material section, as measured by pressure indicator 103, are then recorded. The atmospheric gas flow conductance of the test material section can then be calculated from the equation $$S_a = Q/(P_1 - P_2)$$

where
$S_a$ = atmospheric gas flow conductance of the test material section, liters/sec.
Q = gas flow rate in atmosphere—liters/sec.
$P_1$ = upstream pressure, atm.
and $P_2$ = downstream pressure, atm.

Once the atmospheric gas flow conductance has been calculated, the vacuum flow conductance $S_v$ for the gas flow passage means in the test material section can be estimated from the equation $$S_v = S_a/14,000\, D$$

where D = the average gas flow passage diameter in cm. The value of D in the above equation, the average gas flow passage diameter of the gas flow passages in the test material section, may readily be determined by standard porosimetry measurements in a manner well known to those skilled in the art.

Figure 8:
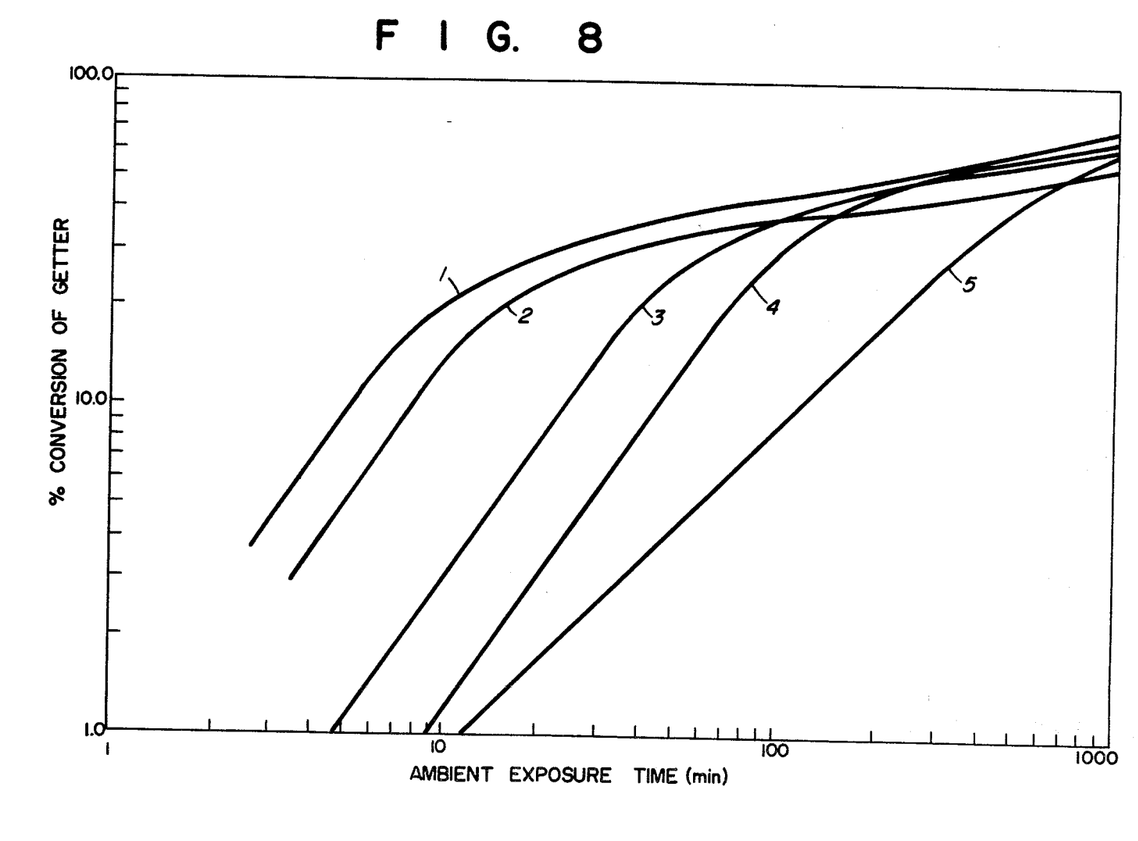
FIG. 8 is a graph of percentage conversion of active getter plotted as a function of ambient exposure time, for several illustrative getter containers.

FIG. 8 is a graph of percentage conversion of active getter plotted as a function of ambient exposure time, for several illustrative getter containers. This graph shows the results of ambient exposure tests which were conducted using embodiments of the invention similar to those shown in FIGS. 1 and 2. In these tests, the gas flow passages of the getter containers were exposed, by gas communication establishment, to the atmosphere at ambient conditions. The exposed getter containers were placed on a scale and weight gain of the reacting getter was measured at various times thereafter. From these measurements the percentage conversion of the original weight of active getter was calculated, and the resulting values were plotted as a function of ambient exposure time, as shown in FIG. 8.

In the above tests, the active getter consisted of barium metal in the form of a finely divided powder. The powder had an unpacked density of about 0.3 gm/cc; particles ranged from about 0.05 to 1.0 micron in diameter. The sorption characteristics for barium which were used as a basis for calculation of conversions are shown in the table below.

TABLE I

Chemical Sorption Characteristics of Barium Getter

| Gas | Reaction Products | Useful Capacity at 70° F., $\mu$-liters/gm. |
|---|---|---|
| $N_2$ | $Ba_3N_2$ | 35,000 |
| $O_2$ | BaO | 53,000 |
| $H_2$ | $BaH_2$ | 110,000 |
| $H_2O$ | $Ba(OH)_2$, $BaH_2$ | 12,000 |
| CO | $BaC_2$, BaO | 8,000 |
| $CO_2$ | $BaCO_3$, $BaC_2$, BaO | 7,000 |

Capacity, as used above, refers to the amount of gas getterable by a unit weight of getter. The values in FIG. 1 are practical capacities, as distinguished from theoretical stoichiometric values based on complete reaction of getter. How closely a given quantity of getter material approaches its theoretical capacity depends greatly on its physical form; the more finely divided the getter the closer the approach to theoretical capacity will be. For barium in the form used in the above test, a large amount of reactive surface area is provided which permits effective utilization of up to 90% of the total barium introduced.

Referring now to FIG. 8, curves 1–4 show the performance characteristics of several containers of the type shown in FIG. 1 having a receptacle volume of approximately 30 cc holding 2 grams of active barium getter together initially with argon gas at one atmosphere pressure. All of the containers had aperture gas flow passages of constant circular cross-section with a longitudinal dimension in the direction of gas flow of 0.025 cm. Curve 1 shows the performance behavior of a container having a 0.076 cm. diameter gas flow passage; curve 2 corresponds to a 0.051 cm. diameter passage, curve 3 to a 0.027 cm. diameter passage, and a curve 4 to a 0.013 cm. diameter passage. Curve 5 shows the performance behavior of a container of the type shown in FIG. 2, having a receptacle volume of 30 cc containing 10 grams of barium with a tubular gas flow passage 0.076 1 cm. in diameter and 1.27 cm. in length.

As shown by the FIG. 8 curves, the consumption of the active barium getter is maintained at low levels even after moderately long periods of ambient exposure. As an example, the container corresponding to curve 3 restricts the conversion of barium to only 15% after 30 minutes exposure. The conversion of getter in the curve 5 container is only about 5% after one hour exposure time. Even after an extended period of time such as 100 minutes, all the FIG. 8 containers contain over 50% of the original amount of active getter in a pure, uncombined state.

Figure 9:
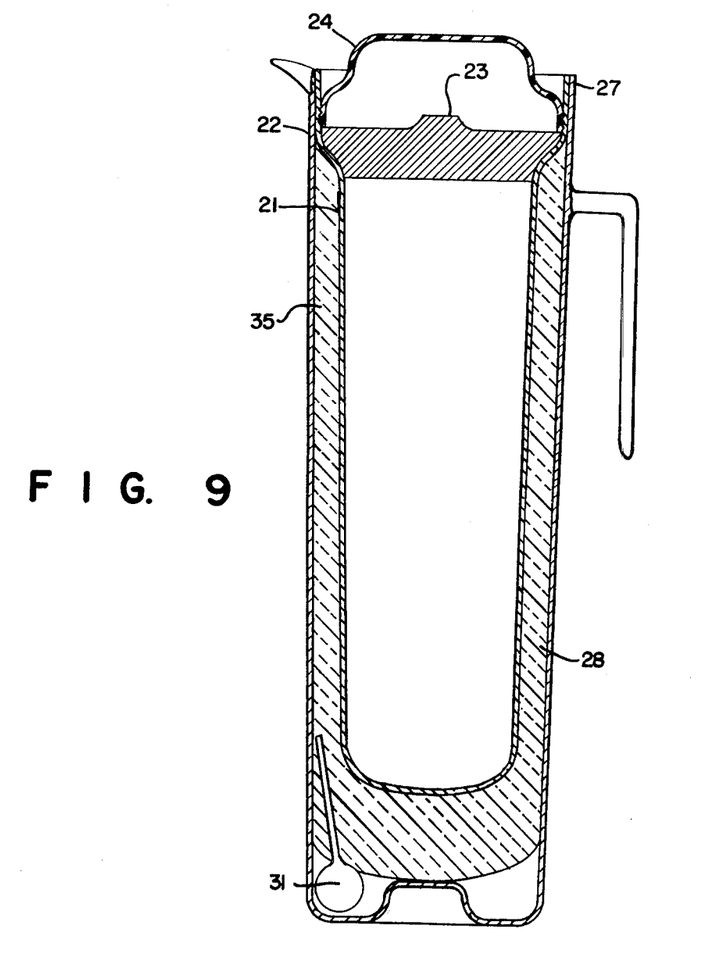
FIG. 9 is a sectional view of a vacuum insulated liquid storage and dispensing container employing the getter container of FIG. 2.

Referring now to FIG. 9, an illustrative vacuum insulated vessel employing the invention is shown which is especially suited to the storage and dispensing of beverages, as for example hot coffee, ice-cooled liquids, and the like. The illustrated vessel may for example have a capacity of approximately one liter. As shown in FIG. 9, the container is fabricated with an inner wall 21 and an outer wall 22 both of which may be of aluminum construction and about 80 mils in thickness and which are integrally joined at joint 27. The joint is preferably formed under vacuum and may be formed by any of a variety of commercially available bonding or joining methods, such as welding. The vacuum vessel features a plug 23 constructed of low thermal conductivity material. An overlying cap 24 is provided with threading on its lower periphery complimentary to threading on inner wall 21. When the respective threadings are fully engaged, the cap exerts a compressive force on plug 23, thereby serving to form a substantially fluid-tight seal between the plug and the inner wall. The vessel also has spout means to facilitate dispensing of liquid; the cap 24 may advantageously be used as a receptacle for the liquid thereby dispensed.

The vacuum space 35 enclosed by walls 21 and 22 may be for example about 1 liter in volume. Within the vacuum space, there is provided an insulation medium 28 such as glass fiber. In the lower portion of the vacuum space is positioned an exposed getter container 31 similar to that illustratively described in connection with FIG. 2. The container 31 may for example comprise a receptacle of 0.25 cc volume holding 0.03 grams of active barium getter powder and a tubular gas flow passage 0.005 cm. in diameter and 1.27 cm. in length. The active getter permits the maintenance of low vacuum pressures, e.g. 100 microns Hg, in the insulation space for extended periods of time, as for example 5 years.

Figure 10:
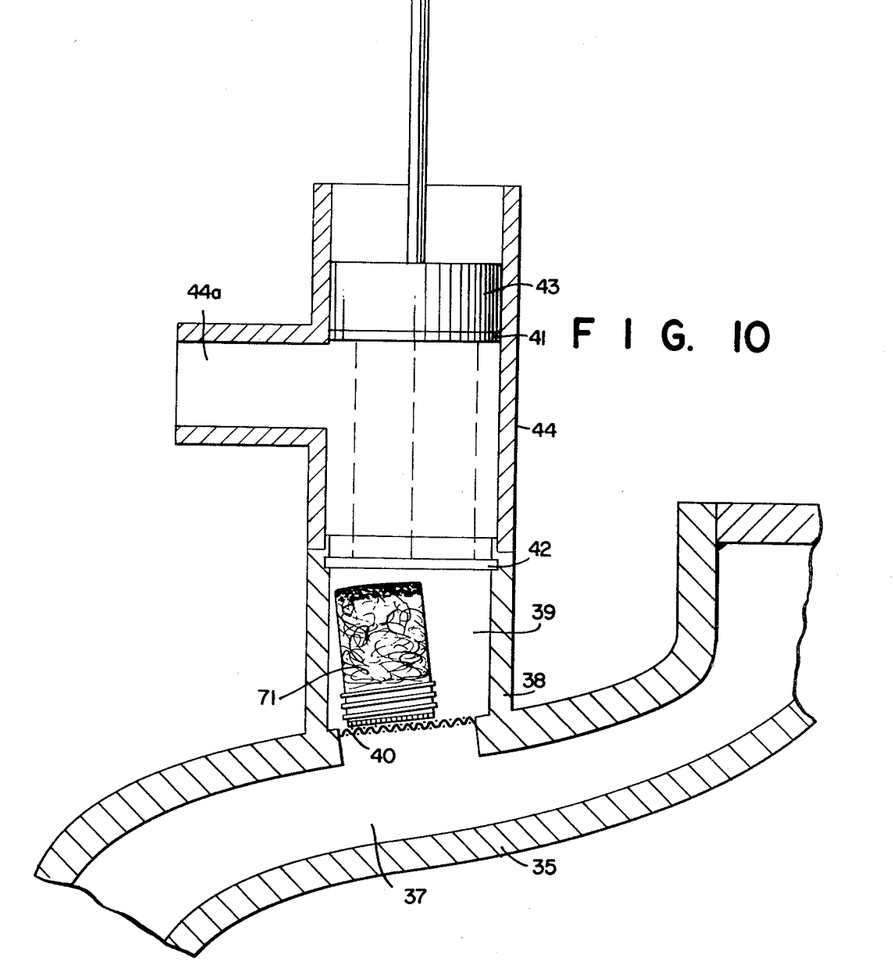
FIG. 10 is a sectional view of a double walled vacuum enclosure showing attached evacuating and sealing means and an internally disposed getter container of a type as shown in FIG. 1, by which the method of the invention is described.

FIG. 10 is a sectional view of a double walled vacuum enclosure showing attached evacuating and sealing means and an internally disposed getter container of a type as shown in FIG. 1. An illustrative method of establishing and maintaining vacuum in accordance with the present invention will now be described with reference to the system shown in FIG. 10. In the drawing a portion of a double-walled vacuum-insulated vessel suitable for storage and transport of cryogenic liquids is shown together with associated evacuation equipment and getter container similar to that shown in FIG. 1. The vessel undergoing evacuation has an inner wall 35 and an outer wall 36 both of metal construction enclosing the vacuum space 37 and a cylindrical extension 39. The space 37 may be a straight vacuum insulated space provided with highly polished reflective interior wall surfaces or it may be filled with a powder insulation of finely divided low conductive particles as disclosed in U.S. Pat. No. 2,967,156 to L. C. Matsch et. al, or it may be provided with composite insulation of the type disclosed in U.S. Pat. No. 3,007,596 to L. C. Matsch. Vacuum spaces 37 and 39 are in fluid communication with one another through the support screen 40 on which the getter container 71 is positioned.

In accordance with the method of the present invention, a fluid-tight container holding active getter and non-sorbable gas at a pressure of at least about one atmosphere is initially provided. Gas flow communication is established through a wall of the container between the active getter and the container-surrounding environment by passage means in the container wall, such that the ratio of the vacuum flow conductance of the gas flow passage means, in liters/sec., to the mass of the active getter held in the container, in grams, is in the range of from about $6.0 \times 10^{-8}$ to about $1.0 \times 10^{-2}$. In the FIG. 10 system, gas flow communication through a wall of the container 71 is established between the active getter and the ambient atmosphere by removal of the closure means on the aperture gas flow passage into the container. After positioning the exposed container in extension space 39, as shown, the T-shaped evacuation joint 40 is affixed to extension walls 38. In its upper cylindrical portion the evacuation joint contains a movable piston 43 having a sealing plate member 41 of the type commonly known as a bursting disk associated therewith. The tubular section 44a of the evacuation joint 44 is joined with pumping means (not shown) and gas is subsequently removed from the vacuum enclosure comprising vacuum space 37 and compartment 39, and from the container 71 through the gas flow passage means, for evacuation thereof. Gas is removed in an amount sufficient to reduce the pressure in the vacuum enclosure and container to subatmospheric pressure, below 200 microns Hg and preferably below 100 microns Hg, as for example 20 microns Hg, the piston 43 is lowered and the bursting disk is introduced and secured at position 42 in a manner well known in the art, thereby sealing the evacuated vacuum enclosure. The evacuation joint is then removed and the vessel may be placed into service. After the vacuum enclosure of the vessel is sealed, sorbable gases flow into the container 71 and are sorptively removed by the active getter therein.

In a further test, the method described above in connection with FIG. 10 was employed to rehabilitate three double-walled vacuum-insulated cryogenic liquid storage vessels which had lost vacuum after an extended period of field service. The vessels each had a liquid storage volume of approximately 150 liters and a vacuum insulation space volume of 50 liters. Vacuum was formed in the vacuum insulation spaces of these vessels by the above-described method of this invention, using getter containers similar in structure to the container of FIG. 1 each having a receptacle 30 cc in volume containing 5 grams of barium powder with a circular aperture gas flow passage 0.025 cm. in diameter and 0.025 cm. in length. Following regeneration, the vessels were stored at ambient conditions and measurements of vacuum pressure were made at periodic intervals. One of the vessels lost vacuum again almost immediately due to insufficient leak-tightness of the casing. In the remaining two vessels, however, low vacuum pressures were maintained; after 2½ years, one vessel had a vacuum pressure of about 12 microns Hg, while the vacuum pressure in the other was less than 1 micron Hg.

In another test of the invention, getter containers substantially identical to those used in the above-described rehabilitation test were employed to form and maintain vacuum in fourteen cryogenic liquid vessels having a liquid storage volume of 169.6 liters and a vacuum insulation space volume of 53.0 liters. After evacuation and sealing, the vessels were placed into service and used for the storage of liquid cryogens. After various periods in service ranging up to 37 months and vacuum levels in the containers were evaluated by measurement of normal evaporation rates (NER). In the procedure for determination of the NER, the container was initially filled with 25 pounds of saturated nitrogen liquid, weighed, and then reweighed after 24 hours. After an additional 24 hours, the container was again reweighed. The difference between the initial weight and the reweighed weight for each of the 24 hour periods was then recorded as the NER in terms of lbs. $N_2$/day.

The test results are shown below in Table II.

TABLE II

| | Normal Evaporation Rate Data | | |
|---|---|---|---|
| Vessel | Period in Service | NER lbs. $N_2$ evaporated/ day (1st 24 hours) | NER lbs. $N_2$ evaporated/ day (2nd 24 hours) |
| 1 | 25 months | 0 | 2 |
| 2 | 25 months | 0 | 0 |
| 3 | 25 months | 0 | 1 |
| 4 | 25 months | 0 | 1 |
| 5 | 25 months | 0 | 3 |

TABLE II-continued

| | Normal Evaporation Rate Data | | |
|---|---|---|---|
| Vessel | Period in Service | NER lbs. $N_2$ evaporated/ day (1st 24 hours) | NER lbs. $N_2$ evaporated/ day (2nd 24 hours) |
| 6 | 25 months | 0 | 0 |
| 7 | 37 months | 0 | 0 |
| 8 | 37 months | 0 | 1 |
| 9 | 37 months | 0 | 0 |
| 10 | 37 months | 0 | 2 |
| 11 | 32 months | 0 | 2 |
| 12 | <32 months | 0 | 1 |
| 13 | <32 months | 0 | 2 |
| 14 | <32 months | 0 | 2 |

The data show no evaporation loss of liquid nitrogen from any of the vessels after the first 24 hours. After the second 24 hours, four of the vessels showed no evaporation loss of liquid nitrogen, four vessels showed 1 lb. evaporation loss, five vessels showed 2 lb. losses and one vessel showed a 3 lb. loss. Even in the last-mentioned case wherein a 3 lb. loss was measured, the loss amounted to only 12% of the liquid nitrogen charged to the vessel.

As shown by the foregoing, the evaporation losses were low in all cases, and all of the vessels tested showed NER values that were consonant with efficient vacuum insulation.

Although preferred embodiments of the invention have been described in detail, it will be appreciated that other embodiments are contemplated along with modifications of the disclosed features, as being within the scope of the invention.

What is claimed is:

1. A method of evacuating a vacuum enclosure comprising the steps of:
   (a) providing a fluid-tight container holding active getter and non-sorbable gas at a pressure of at least about one atmosphere;
   (b) establishing gas flow communication through a wall of said container between said active getter and the container-surrounding environment by passage means in said container wall, such that the ratio of the vacuum flow conductance of the gas flow passage means, in liters/sec., to the mass of said active getter held in said container, in grams, is in the range of from about $6.0 \times 10^{-8}$ to about $1.0 \times 10^{-2}$;
   (c) positioning the container in said enclosure for gas flow communication between said active getter and the enclosure environment;
   (d) thereafter removing gas from the enclosure and from the positioned container through said passage means for evacuation thereof, in an amount sufficient to reduce the pressure in said enclosure and container to subatmospheric pressure; and
   (e) sealing the evacuated enclosure.

2. A method according to claim 1 wherein the subatmospheric pressure of step (d) is less than 200 microns Hg.

3. A method according to claim 1 wherein the gas flow communication of step (b) is established by puncturing the container wall to form said passage means.

4. A method according to claim 1 wherein the gas flow communication of step (b) is established by removing closure means from said passage means.

5. A method of evacuating a vacuum enclosure comprising the steps of:

(a) providing a fluid-tight container holding active barium getter and argon gas at a pressure of substantially one atmosphere;

(b) establishing gas flow communication through a wall of said container between said active barium getter and the container-surrounding environment by passage means in said container wall, such that the ratio of the vacuum flow conductance of the gas flow passage means, in liters/sec., to the mass of said active barium getter held in said container, in grams, is in the range of from about $6.0 \times 10^{-8}$ to about $1.0 \times 10^{-2}$;

(c) positioning the container of step (b) in said enclosure for gas flow communication between said active barium getter and the enclosure environment;

(d) thereafter removing gas from the enclosure and from the positioned container through said passage means for evacuation thereof, in an amount sufficient to reduce the pressure in said enclosure and container to below 100 microns Hg; and (e) sealing the evacuated enclosure.

* * * * *